United States Patent Office 3,557,401
Patented Jan. 26, 1971

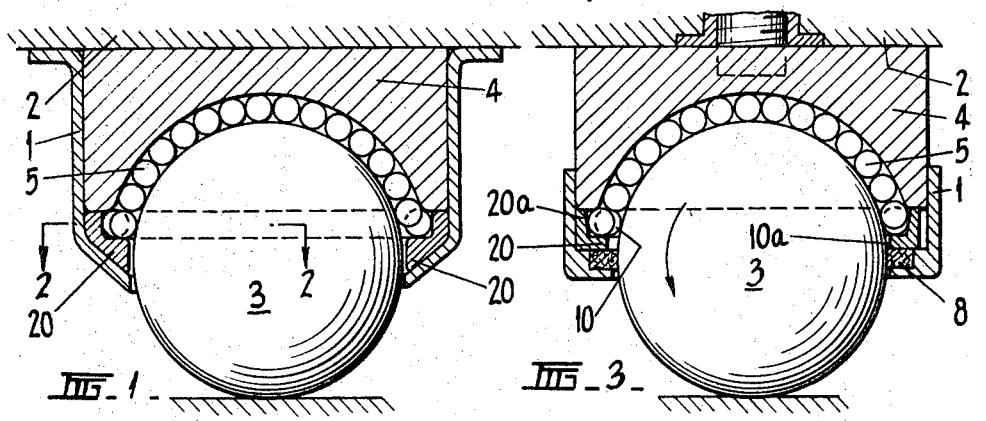
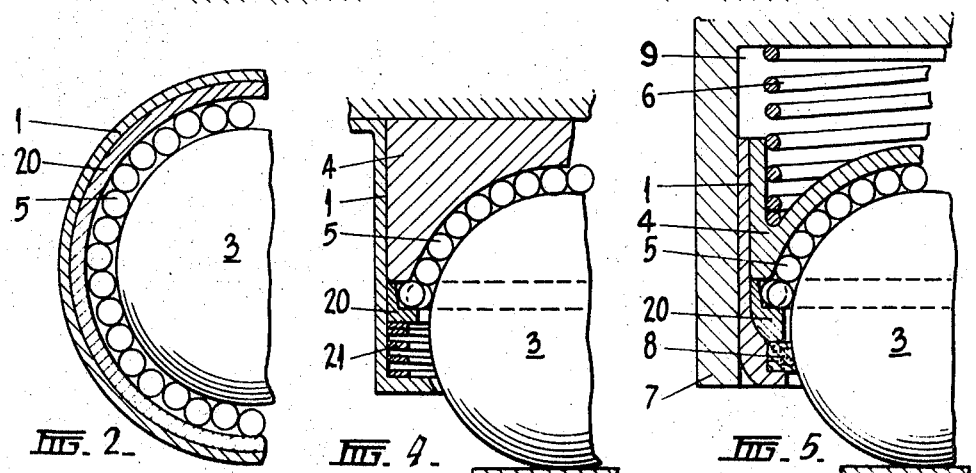
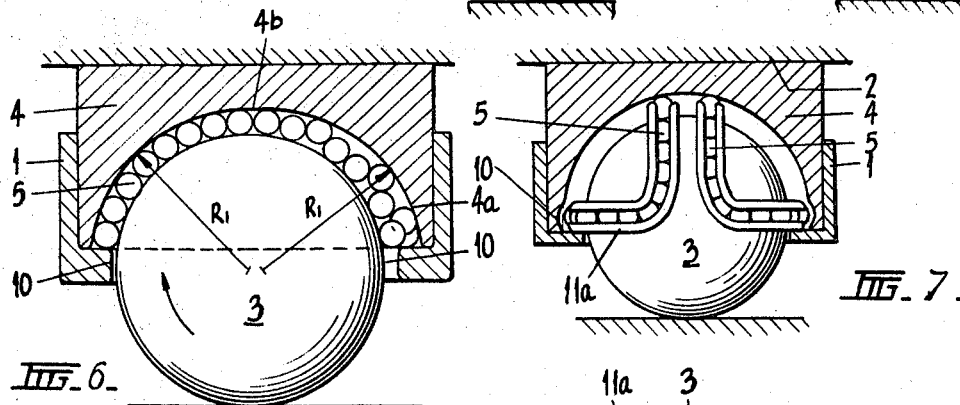
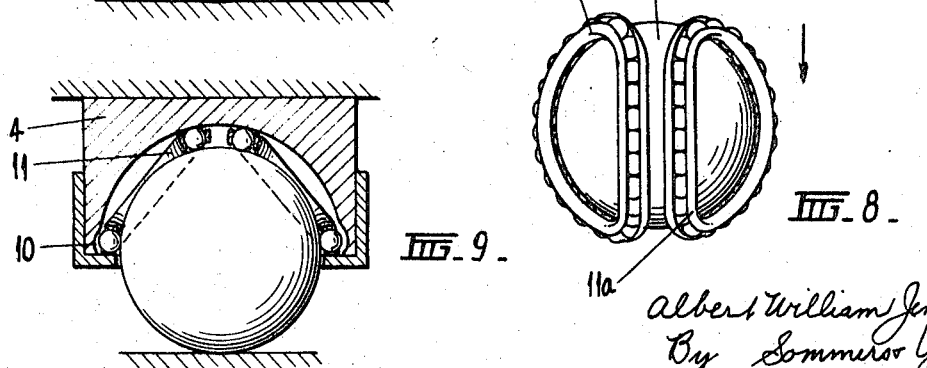

3,557,401
CASTORS
Albert William Jenkins, 8 Longbrae Court,
Forest Hills, Victoria, Australia
Filed Feb. 26, 1968, Ser. No. 708,371
Claims priority, application Australia, Feb. 28, 1967,
18,275/67
Int. Cl. B60b *33/08*
U.S. Cl. 16—26             2 Claims

ABSTRACT OF THE DISCLOSURE

The invention provides an improved castor of the type having a plurality of small balls disposed in a space for dual rolling contact between a load supporting large ball and a housing skirting and retaining the large ball and the housing is constructed to allow free movement of the small balls in the space whereby clustering and resultant jamming of the small balls is prevented.

---

This invention relates to ball type castors which facilitate movement of a supported object.

At present, widely used castors have a first vertical axis through the point of contact with the article which is offset from a second vertical axis passing through the point of contact of the castor with the floor. These can be described as offset castors, and are commonly applied to furniture to facilitate movement of the furniture across a floor or other surface.

This construction has an inherent disadvantage which is revealed at the outset of movement of the supported article. The castor must assume an operating position before rolling commences, and the position is dictated by the offset configuration of the two abovementioned axes.

Specifically, the operating position requires that the two axes be approximately aligned in the direction of travel and consequently, when the article is initially moved, each castor must swivel about the first vertical axis to the operating position.

Consequently, there is a time delay before smooth rolling is achieved, and the swivelling movement causes wear at the point of contact between castor and floor.

A further disadvantage of this construction is the overturning movement which is inherent in the horizontal displacement of the first and second vertical axes.

Ball type castors presently in use overcome to a large extent the basic disadvantages of the offset castor in providing a load bearing large ball entrained in a support housing having a plurality of small balls therebetween intended to cause rolling contact between the large ball and the bed of the support housing. However, it is apparent that this fundamental construction is not entirely satisfactory in use, being rough in operation. It has been found that this objectionable condition is brought about by sliding contact between the large ball and the small balls rather than rolling contact therebetween. Sliding contact is caused by the tendency of the small balls to crowd and jam together after movement in any given direction for a short distance and accordingly friction between the housing and the large ball is substantially increased and variable thus giving rise to the rough operation. Attempts are known wherein the small balls are prevented from jamming together; however, the resulting construction is apparently of a relatively complex nature which could lead to high manufacturing costs.

The principal object of the present invention is to provide a smooth running ball type castor which is relatively simple and economical to manufacture, and effective in use.

The present castor overcomes the aforesaid disadvantages of an offset castor whilst being free from the poor action accruing in ball type castors.

With the abovestated object in view there is provided according to the present invention a ball castor of the type having a plurality of small balls disposed in a space for dual rolling contact between a load supporting large ball and support means skirting and retaining the large ball, characterized in that the space formed between the support means and the large ball is radially enlarged at least near the mouth of the support means skirting the large ball whereby the small balls at the termination of their travel over the large ball lose dual contact with the large ball and the support means and are forced by succeeding small balls to move in the enlarged space to a position where said dual contact can be regained by the small balls, the enlarged space being bounded solely by the support means and the large ball.

In its application to the support of furniture, the large ball projects from the mouth of the housing to contact the floor. The large ball can rotate in any direction within the housing, and dual rolling contact between the top of the large ball and the housing is provided by the small balls. These small balls allow free rotation of the large ball while the furniture is being moved even though considerable vertical load may be transmitted between the large ball and the housing.

In its application to the movement of an article over a stationary point such as in a conveyor system, the ball castor according to the invention is simply inverted to present the exposed surface of the large ball to the underside of the supported article, and the small balls operate in the same way to effect rolling contact as above described.

There may be further provided according to the invention, a castor as above described and including spring means allowing receding movement of the housing whereby the large ball can recede within a housing support under predetermined load conditions whereupon the housing support engages the floor. In more detail, a spring is interposed between the housing skirting the top of the ball and the said housing support.

For use on furniture, the housing support is provided with an extensive floor contacting surface so that recession of the ball under load allows the housing support to contact the floor, consequently the wear on the floor is considerably less than would be caused by point contact of the stationary ball. For use in moving an article above an inverted stationary ball castor there need be no such extensive surface but the spring affords relief to shock induced by obstacles such as ridges on the moving article.

In the following description, the practical arrangement and operation of only one castor will be described with reference to the accompanying drawings in which:

FIG. 1 is a side sectional view of one arrangement of a ball type castor constructed in accordance with the invention.

FIG. 2 is a partial sectional plan view taken on section line 2—2 of FIG. 1.

FIG. 3 is a side sectional view of another arrangement of a ball type castor constructed in accordance with the invention.

FIGS. 4 to 6 are partial side sectional views showing examples of ball type castor arrangements which may be constructed in accordance with the invention.

FIG. 7 is a sectional view of the trailing side of one arrangement incorporating small ball retaining cages constructed in accordance with the present invention.

FIG. 8 is a partial plan view of FIG. 7 showing the cage configuration.

FIG. 9 is a side sectional view of another arrangement of the ball type castor incorporating the small ball retaining cages.

The description is directed to arrangements, whereby the castor is used to support furniture or similar articles. It is to be noted that a similar construction is applicable to use in an inverted position for moving an article over an inverted stationary ball castor, and facilitating movement of the article over that point.

There is provided a support housing 1 having a top surface adapted for fixing to the underside of an article 2 such as furniture. The lower part of the housing is adapted to embrace or skirt a large ball 3 below the midpoint thereof, and thus retain the large ball 3 within the housing 1 with the lower portion of the large ball projecting from the housing 1 to contact the floor. Fixed within the housing 1 or forming a part thereof is a shroud or skirt 4 comprising part of a sphere and located to complement the top of the large ball 3. In an alternative the skirt 4 may be attached to the article 2 while the housing 1 attaches to the skirt 4. Between the large ball 3 and the skirt 4 is a plurality of small balls 5 which roll on the surfaces of both the ball 3 and the housing skirt 4 and permit the large ball 3 to rotate freely within the housing skirt 4. Due to the rolling contact of the small balls 5 against both surfaces, the transmission of the load of the article 2 is effected with a minimum of friction.

A feature at or near the mouth of the housing skirt 1 permits recirculation of the small balls 5, and prevents them from jamming together at one side of the housing 1 when the castor is operating. Recirculation is necessary, since the mechanics of rolling contact require that the small balls 5 move over the surface of the skirt and the large ball 3 and do not simply rotate on one spot. Thus in some arrangements (see FIGS. 6, 7 and 9) the mouth of the skirt 4 is enlarged or widened so that an enlarged space 10 is formed whereby the ball may move into the enlarged space and out of dual contact with the skirt 4 and the large ball 3. When the supported article 2 is moved across a floor the large ball 3 rolls across the floor, and the small balls 5 rotate in the load transmitting area between the large ball 3 and housing skirt 4. The small balls 5 also move circumferentially in the direction of movement of the article and tend to cluster against the forward section i.e. in direction of movement of the skirt 4. The enlarged mouth 10 of the present device allows relief of the tendency to cluster and jam at this section by permitting each small ball 5 to pass out of dual contact with the ball 3 and skirt 4, into the mouth 10, and hence to be forced rearward along the mouth by the force of other small balls 5 following it. At a point near the rear section of the skirt 4, the movement of a small ball 5 travelling rearward along the enlarged mouth 10 from the front section will meet resistance from other small balls moving around the other side of the enlarged mouth 10 and will be forced out of the mouth and back into the confined space between the large ball 3 and housing skirt 4. In this region, dual contact allowing rolling and load transmission by the small ball 5 between large ball 3 and skirt 4 will be regained, and the cycle will be repeated.

The design of the enlarged mouth 10 assists the return of the small balls 5 into dual rolling contact with large ball 3 and skirt 4.

In an alternative arrangement to enlarging the mouth of the skirt 4 there may be provided ring 20 which embraces the large ball 3 immediately below the mouth of the skirt 4, and is of slightly larger inside diameter than the mouth. Refer FIGS. 1 to 5. In operation, the small balls leave the front section of the housing and become entrained between the ring and the large ball. Since ring 20 is of slightly larger diameter than the mouth of the skirt 4, it tends to move forward (see FIG. 3) under the pressure influence of small balls 5 clustering to create an enlarged space 10 at the front section. The ring-to-ball association presents a converging track to the small balls, whereby the enlarged space 10 thus formed is gradually restricted at 10a from the forward section to the rear section of the entrainment path, at which point the ring 20 is complemental to the mouth of the skirt 4. Consequently, the rearward movement of the small balls 5 within this region is positively guided, and the return to recirculation over the top of the ball at this point is assisted. Also, pressure tending to produce clustering is relieved by movement of the ring. Further assistance may be achieved by providing the ring 20 with an internal upwardly diverging taper 20a, or biassing the ring 20 upwards by spring means 21 in FIG. 4.

In another practical arrangement referring to FIG. 6, a modified hemispherical skirt houses the large ball 3 above described and is characterized by being slightly oversize, or slightly deformer relative to the large ball 3 whereby the ball is allowed a small planar movement within the skirt 4. The modified hemisphere is characterized by each half thereof having a different centre of curvature of similar radii $r_1$ and a flat band at 4b provided joining the two curves. The small balls 5 are provided for dual rolling contact as before. In operation, the large ball 3 moves to take up a position rearwardly within the skirt 4 at the onset of movement so that the ball-to-skirt association provides a forwardly diverging space between the large ball and the forwardly directed skirt portion 4a. Thus the pressure tending to produce clustering of the small balls 5 is relieved as they move out of dual contact at the top of the ball into the diverging space 10 formed and then travel rearwardly to the rear section which exhibits a restricted space in a similar manner as shown in FIG. 3. The provision of the converging path guides the movement of the small balls 5 on their path to the rear section, and they positively regain dual contact over the top of the large ball 3 as has been described before.

In another practical arrangement, referring to FIG. 5, the small balls 5 recirculate within the housing skirt 4 as above described, and the housing skirt 4 is formed from a pressing as shown which is shaped to locate a spring 6. The entire unit is adapted to be disposed in a recess 9 in a furniture leg and to recede therein when load is applied to the article of furniture. The lower part of the recess 9 is provided with a flat floor-contacting surface 7.

In operation, the spring 6 is designed to support an unloaded article of furniture with the ball 3 projecting from the housing for rolling motion on the floor. When the article is loaded, such as by persons using the article, the spring 6 is compressed and the castor recedes within the recess and the surface 7 contacts the floor. The loaded article is consequently supported on the floor by a larger area than the ball 3 would present to the floor, with attendant reduction in wear on the floor. Also, with rolling contact no longer existing between the floor and the article, accidental movement of the article is impeded.

When the article is unloaded, the spring 6 resumes its initial position and the castor projects from the recess 9 and resumes sole contact with the floor to allow movement of the articles. The provision of a spring 6 as described also permits shock relief when obstacles to movement, such as ridges on a floor, are encountered by the rolling ball.

In a further arrangement, the construction involving a plurality of small balls 5 is replaced by a pair of ball carrying cages set on the large ball 3. The cages are located on opposing sides of the upper surface of the large ball, with their tops close together near the top of the large ball as shown in FIGS. 7 to 9.

The cages 11 may take many forms, one being of a single circular form entraining the small balls, whereby both top and bottom of the ball is salient as shown (see FIG. 9). Alternatively the pair of cages 11a may be shaped whereby the small balls 5 therein are restrained to two directions of travel, one half of the cage extending over the top of the large ball 3 in a vertical plane from one mid point to the other and the other half of the cage 11a extending in a horizontal plane to complete the travel of the entrained balls 5 over and then around the large ball (see FIG. 7). The cages 11a thus formed when assembled upon the large ball are parallel disposed for a predetermined distance over the top of the ball 3 in the vertical plane and the pair of cages in the horizontal plane extend almost completely about the circumference of the large ball 3.

According to the invention, an enlarged space 10 is formed adjacent the mouth of the skirt 4 and near the mid point of the large ball to allow for a free swivelling action of the cages 11, 11a, to accord with the direction of travel of the supported article.

Thus in the provision of a pair of circular cages as shown, the skirting mouth is modified to create an enlarged space 10 whereby the cage of balls move freely over the surface of the ball regardless of direction of travel. Slight resistance to change of direction is to be expected as the small balls are moved from their intended line of travel.

This lateral force is not present with the modified cage of FIG. 7 as shown, however, the cage 11a is not free to rotate in the direction of the balls as is the case with the circular cage 11. This feature can be put to advantage by suitably shaping the trailing edge, see FIG. 8, of the cage to assist the swivelling action thereof during a change in direction of travel.

In the modified cage 11a the part extending in the horizontal plane is enlarged and partially enclosed or alternatively said part is disposed in an enlarged space 10 as shown whereby the balls are only in contact with the large ball, the enclosure allowing the balls to move out of dual contact with the large ball and the housing and thus prevent jamming.

In operation, movement of the supported article causes the castor to align the direction of motion with the vertical plane centrally disposed between the two cages. In this position, free rolling of the ball along the floor ensues.

The spring device 6 may also be provided in these constructions.

As a further constructional feature of the abovementioned castors, a dust seal 8 may be provided between the housing and the ball, so that entry of foreign particles will be inhibited.

The above description provides a device which overcomes the disadvantages of present castors, and may be employed to support an article and facilitate its movement. In a particular application, the device is suited to use on beds, trolleys, couches, chairs, tables, trays and the like, which require movement over floor surfaces. In a further application, the device is suitable for attachment to a point in an inverted position to support an article, such as a flat slab, which is free to move over that point.

I claim:
1. A ball castor of the type having a plurality of small balls disposed in a space for dual rolling contact between a load-supporting large ball and support means skirting and retaining the large ball,
   the space between the support means and the large ball being radially enlarged at least near the mouth of the support means skirting the large ball whereby the small balls at the termination of their travel over the large ball lose dual contact with the large ball and the support means and are forced by succeeding small balls to move in the enlarged space to a position where said dual contact can be regained by the small balls,
   said support means including a housing having an inlet of modified hemispherical form skirting the large ball,
   the radius of each half of the hemisphere having a different center of curvature the radii of curvature of which are equal,
   whereby the depth of the modified hemisphere is less than half of the dimension across the mouth of the hemisphere.

2. A ball castor of the type having a plurality of small balls disposed in a space for dual rolling contact between a load-supporting large ball and support means skirting and retaining the large ball,
   the space between the support means and the large ball being radially enlarged at least near the mouth of the support means skirting the large ball whereby the small balls at the termination of their travel over the large ball lose dual contact with the large ball and the support means and are forced by succeeding small balls to move in the enlarged space to a position where said dual contact can be regained by the small balls,
   said support means including a housing having an inlet of modified hemispherical form skirting the large ball the radius each half of the hemisphere having a different center of curvature the radii of curvature of which are equal whereby the depth of the modified hemisphere is less than half of the dimension across the mouth of the hemisphere,
   and at the onset of movement of the castor the support means moves relative to its position with the large ball to take up a position in which said radial enlargement is formed into which said balls terminate their travel over the large ball.

References Cited

UNITED STATES PATENTS

| 3,381,330 | 5/1968 | Aninger | 16—21 |
| 3,401,421 | 9/1968 | Aninger | 16—26 |
| 985,455 | | Russel | 16—26 |

FRANCIS K. ZUGEL, Primary Examiner

D. C. TROUTMAN, Assistant Examiner